(12) United States Patent
Ullman et al.

(10) Patent No.: US 7,955,568 B2
(45) Date of Patent: Jun. 7, 2011

(54) CHEMICAL REACTION-BASED THERMAL MANAGEMENT SYSTEM AND METHOD

(75) Inventors: Alan Z. Ullman, Northridge, CA (US); Clyde D. Newman, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 317 days.

(21) Appl. No.: 12/407,099

(22) Filed: Mar. 19, 2009

(65) Prior Publication Data
US 2010/0236758 A1 Sep. 23, 2010

(51) Int. Cl.
| | |
|---|---|
| B01J 19/00 | (2006.01) |
| F28F 7/00 | (2006.01) |
| F25B 19/00 | (2006.01) |
| F02C 1/00 | (2006.01) |
| F02C 6/18 | (2006.01) |
| F02K 99/00 | (2009.01) |
| B64D 37/00 | (2006.01) |
| B64C 1/38 | (2006.01) |

(52) U.S. Cl. ............. 422/198; 165/138; 62/7; 62/169; 60/266; 60/267; 244/135 R; 244/117 A
(58) Field of Classification Search ............... 422/198; 165/104.19, 138, 202, 233; 62/7, 169, 259.2; 60/772, 780, 266, 267; 244/135 R, 117 A
See application file for complete search history.

(56) References Cited

U.S. PATENT DOCUMENTS

| | | | | |
|---|---|---|---|---|
| 4,776,536 A | * | 10/1988 | Hudson et al. | 244/135 R |
| 5,198,310 A | * | 3/1993 | Fleming et al. | 429/415 |
| 5,337,553 A | * | 8/1994 | Barr | 60/780 |
| 5,392,595 A | * | 2/1995 | Glickstein et al. | 60/780 |
| 5,507,150 A | * | 4/1996 | Weber et al. | 62/100 |
| 6,182,435 B1 | * | 2/2001 | Niggemann et al. | 60/772 |
| 6,939,392 B2 | * | 9/2005 | Huang et al. | 95/46 |
| 2003/0129108 A1 | * | 7/2003 | Burch et al. | 422/188 |

OTHER PUBLICATIONS

MacFarlane et al., "Fuel Options for High Mach Propulsion", McDonnell Aircraft Company, Wright Research and Development Center, WRDC-TR-90/2090, vol. 1, Oct. 1990, 215 pages.
Wassel et al., "An Integrated Modeling Approach for Hypersonic Aircraft Thermal Management", Sixth International Aerospace Planes and Hypersonic Technologies Conference, Apr. 3-7, 1995, Chattanooga, Tennessee, American Institute of Aeronautics and Astronautics, AIAA 95/6022, pp. 1-11.
Korabelnikov et al., "Thermochemical Conversion of Hydrocarbon Fuel for the AJAX Concept", 30th Plasmadynamics and Lasers Conference, Jun. 28-Jul. 1, 1999, Norfolk, Virginia, American Institute of Aeronautics and Astronautics, AIAA-99-3537, pp. 1-6.

(Continued)

*Primary Examiner* — Walter D Griffin
*Assistant Examiner* — Natasha Young

(57) ABSTRACT

The disclosure provides for a chemical reaction-based thermal management system and method. The system comprises a heat source for heating a first flow element, a heat exchanger for transferring heat from the first flow element to a reaction mixture flow, and a heat sink comprising one or more endothermic chemical reactions to absorb heat from the heat exchanger. The system further comprises a reactor element for approaching chemical equilibrium of the reaction mixture flow, a product removal element for removing one or more products from the one or more endothermic chemical reactions, and a plurality of driver elements for moving the first flow element and for moving the reaction mixture flow.

20 Claims, 7 Drawing Sheets

OTHER PUBLICATIONS

Bruno et al., "Reforming and Pyrolysis of Liquid Hydrocarbons and Partially Oxidised Fuels for Hypersonic Propulsion", 36th AIAA/ASME/ASEE Joint Propulsion Conference, Jul. 17-19, 2000, Huntsville, Alabama, American Institute of Aeronautics and Astronautics, AIAA-2000-3619, pp. 1-11.

Gallego-Lizon et al., "Dehydration of water/t-butanol Mixtures by Pervaporation: Comparative Study of Commercially Available Polymeric, Microporous Silica and Zeolite Membranes", Journal of Membrane Science, vol. 197, 2002, pp. 309-319.

Chemical Reaction Engineering Class Lecture Notes, Friedrich-Alexander, University of Erlangen-Nurnberg, Germany, Jul. 2007, 45 pages.

U.S. Appl. No. 12/337,913, "Phase Change Material Cooling System," Alan Z. Ullman (not published).

* cited by examiner

CHEMICAL REACTION-BASED THERMAL MANAGEMENT SYSTEM AND METHOD

BACKGROUND

1) Field of the Disclosure

The disclosure relates to thermal management systems and methods. In particular, the disclosure relates to chemical reaction-based thermal management systems and methods.

2) Description of Related Art

Various components in aircraft, satellites, and other vehicles and craft may generate heat and require cooling. For example, without limitation, line replaceable units and other components in an aircraft or satellite network may require cooling to maintain those components at an appropriate operating temperature. These types of components may generate heat constantly. Other components may generate heat on a non-constant basis. These types of components may generate heat based on an event that may be periodic or non-periodic. For example, without limitation, directed energy weapons, such as lasers or high power microwave systems, that may be carried as a payload may generate heat when those weapons are used. The heat generated may be a large amount of heat over a short period of time. With these and other systems, it may be desirable to provide required cooling for a lowest possible weight.

Lightweight thermal management of heat sources is needed for energy-consuming payloads on mobile platforms, such as aircraft and satellites, particularly where the payload has extremely high cooling loads, such as hundreds of kilowatts, for relatively brief periods of time, such as seconds or minutes. Such payloads may include, without limitation, directed energy weapons such as lasers or high power microwave systems and radar systems. Known thermal management systems exist. One known system uses coolers that exchange heat with ambient air for direct heat rejection. However, such direct heat rejection systems may use large quantities of ram air, which is air outside of the aircraft, and performance may be dependent on ambient temperature, thus restricting the operational envelope. The operational envelope may include speed, altitude, and ambient external conditions such as weather. Another known system uses coolers, refrigerators, or chilling devices that use working fluids in a closed cycle for overboard heat rejection from a low-temperature heat sink to a high-temperature heat sink. However, such closed cycle refrigeration systems may be ill-suited to direct management of thermal loads owing to power, weight, and slow transient response. Another known system uses thermal mass to absorb the heat or sensible heat. For purposes of this application, sensible heat is defined as potential energy in the form of thermal energy or temperature. However, such thermal mass for sensible heat systems may provide limited thermal capacity over a relatively small temperature range due to the low heat capacity of applicable materials. Specific mass, that is, heat per unit mass, is typically not high and systems can quickly become mass-intensive as thermal storage requirement increases. Another known system involves the use of latent heat. Latent heat of phase transitions such as melting (solid to liquid), boiling (liquid to gas), and sublimation (solid to gas) are capable of absorbing heat over a relatively narrow temperature range, which is advantageous for directed energy weapons such as lasers. Phase change materials may either remain on the platform or may be rejected overboard.

Known approaches for using endothermic reactions to provide thermal capacity for heat loads may entail the progressive conversion of a supply of reactants into products. This relies on the thermally-driven equilibrium and kinetics between reactants and products in which the equilibrium composition shifts as the temperature is changed. This may result in a temperature limit on the extent to which the reactants can be converted to products, which in turn, can limit the amount of heat that can be absorbed per unit of mass of reactant. The reactant and product mix may be undifferentiated, thus maintaining the same overall stoichiometry as the reaction progresses from reactants to products. For either a recirculating or once-through reaction mixture flow scheme, accumulation of product can limit the reaction conversion and consequently limit obtainable specific weight.

Accordingly, there is a need for a chemical reaction-based thermal management system and method that provides advantages over known systems and methods.

SUMMARY

This need for a chemical reaction-based thermal management system and method is satisfied. Unlike known systems and methods, embodiments of the system and method of the disclosure may provide one or more of the following advantages: provides a chemical reaction-based thermal management system and method that use endothermic chemical reactions to absorb heat from a heat exchanger or heat source and control the conditions for conducting endothermic chemical reactions so as to match the demands of, including without limitation, temperature and rate, of the thermal load being cooled; provides a chemical reaction-based thermal management system and method having near constant temperature, controllable cooling of a heat source by using one of a number of endothermic chemical reactions with high thermal capacity as the heat sink; provides a chemical reaction-based thermal management system and method providing low cost, low weight cooling and improved performance of airborne or weight-limited payloads; provides a chemical reaction-based thermal management system and method having greater payload capabilities within fixed constraints, including without limitation, weight and platform size; provides a chemical reaction-based thermal management system and method that allow heat to be absorbed at a low temperature and allow achievement of a higher conversion from reactants to products over a narrower temperature range; provides a chemical reaction-based thermal management system and method for reducing the size and weight of thermal management for directed energy weapons so they can be installed on small aircraft (e.g., F-18) or small mobile platforms; provides a chemical reaction-based thermal management system and method having lightweight and high performance thermal management capability controllable in temperature and rate to match the needs of energy consuming payloads; provides a chemical reaction-based thermal management system and method with product composition control to provide lightweight thermal management for heat sources, such as, without limitation, directed energy weapons such as lasers or high power microwave systems, rail guns, particle accelerators, X-ray machines, power conversion subsystems, electric actuators, sensors, parasitic loads with directed energy devices, motive drivers in a cooling system, an airframe, and other heat sources, for applications, including without limitation, hypersonic cooling; and provides a chemical reaction-based thermal management system and method for using endothermic chemical reactions that can provide a high specific weight, resulting in lighter overall systems.

In an embodiment of the disclosure, there is provided a chemical reaction-based thermal management system. The system comprises a heat source for heating a first flow element, a heat exchanger for transferring heat from the first flow element to a reaction mixture flow, and a heat sink comprising one or more endothermic chemical reactions to absorb heat from the heat exchanger. The system further comprises a reactor element for approaching chemical equilibrium of the reaction mixture flow, a product removal element for removing one or more products from the one or more endothermic chemical reactions, and a plurality of driver elements for moving the first flow element and for moving the reaction mixture flow.

In another embodiment of the disclosure, there is provided a chemical reaction-based thermal management system for use on an airborne platform or a field based platform. The system comprises a heat source for heating a first flow element, wherein the first flow element is selected from the group consisting of water, high purity water, generator water, heavy water, carbon tetrachloride, and fuels. The system further comprises a heat exchanger for transferring heat from the first flow element to a reaction mixture flow, wherein the reaction mixture flow comprises one or more chemical reactants in a liquid phase or a gas phase. The system further comprises a heat sink comprising one or more endothermic chemical reactions to absorb heat from the heat exchanger, wherein the endothermic chemical reactions are reactions selected from the group consisting of dehydrogenation, dehydration, dehydrohalogenation, alkane, alkylation, cyclo-addition, ether cleavage, ether formation, amination, peroxide decomposition, inorganic salts, inorganic acids, and inorganic bases, and further wherein each endothermic chemical reaction has a ratio of change in enthalpy to change in entropy of about a temperature of interest. The system further comprises a catalytic reactor bed for approaching chemical equilibrium of the reaction mixture flow. The system further comprises a product removal element for removing one or more products from the one or more endothermic chemical reactions, wherein the product removal element comprises a diffusional membrane, a hydrogen membrane, a cellulose membrane, a synthetic membrane, an absorption system, an adsorption system, a venting system, a transport system, a physical separation system, or a separate chemical reaction system which converts one or more of the products from the one or more endothermic chemical reactions. The system further comprises a plurality of driver elements for moving the first flow element and for moving the reaction mixture flow, wherein the plurality of driver elements is selected from the group consisting of pumps, vents, blowers, fans, eductors, and compressors. The system provides a near constant temperature and controllable cooling of the heat source, and drives the one or more endothermic chemical reactions to proceed from reactants to products by control of product concentrations.

In another embodiment of the disclosure, there is provided a method for chemical reaction-based thermal management. The method comprises heating a first flow element with a heat source, transferring heat with a heat exchanger from the first flow element to a reaction mixture flow, and providing a heat sink comprising one or more endothermic chemical reactions to absorb heat from the heat exchanger. The method further comprises moving the reaction mixture flow from the heat exchanger to a reactor element, approaching chemical equilibrium of the reaction mixture flow with the reactor element, removing one or more products from the one or more endothermic chemical reactions with a product removal element, and moving the reaction mixture flow back to the heat exchanger.

In another embodiment of the disclosure, there is provided a method for chemical reaction-based thermal management for use on an airborne platform or a field based platform. The method comprises heating a first flow element with a heat source, wherein the first flow element is selected from the group consisting of water, high purity water, generator water, heavy water, carbon tetrachloride, and fuels. The method further comprises transferring heat with a heat exchanger from the first flow element to a reaction mixture flow, wherein the reaction mixture flow comprises one or more chemical reactants in a liquid phase or a gas phase. The method further comprises providing a heat sink comprising one or more endothermic chemical reactions to absorb heat from the heat exchanger, wherein the endothermic chemical reactions are reactions selected from the group consisting of dehydrogenation, dehydration, dehydrohalogenation, alkane, alkylation, cyclo-addition, ether cleavage, ether formation, amination, peroxide decomposition, inorganic salts, inorganic acids, and inorganic bases, and further wherein each endothermic chemical reaction has a ratio of change in enthalpy to change in entropy of about a temperature of interest. The method further comprises moving the reaction mixture flow from the heat exchanger to a catalytic reactor bed. The method further comprises approaching chemical equilibrium of the reaction mixture flow with the catalytic reactor bed. The method further comprises removing one or more products from the one or more endothermic chemical reactions with a product removal element, wherein the product removal element comprises a diffusional membrane, a hydrogen membrane, a cellulose membrane, a synthetic membrane, an absorption system, an adsorption system, a venting system, a transport system, a physical separation system, or a separate chemical reaction system which converts one or more of the products from the one or more endothermic chemical reactions. The method further comprises moving the reaction mixture flow back to the heat exchanger. The method further comprises providing a plurality of driver elements for moving the first flow element and for moving the reaction mixture flow, wherein the plurality of driver elements is selected from the group consisting of pumps, vents, blowers, fans, eductors, and compressors. The method provides a near constant temperature and controllable cooling of the heat source, and drives the one or more endothermic chemical reactions to proceed from reactants to products by control of product concentrations.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The disclosure provides for a chemical reaction-based thermal management system and method for using endothermic chemical reactions to absorb heat from a heat exchanger or heat source. The system and method of the disclosed embodiments may be used in aircraft, satellites, or other suitable vehicles and craft. Accordingly, one of ordinary skill in the art will recognize and appreciate that the system and method of the disclosure can be used in any number of applications involving a chemical reaction-based thermal management system and method for use in aircraft, satellites, or other suitable vehicles and craft.

Figure 1:
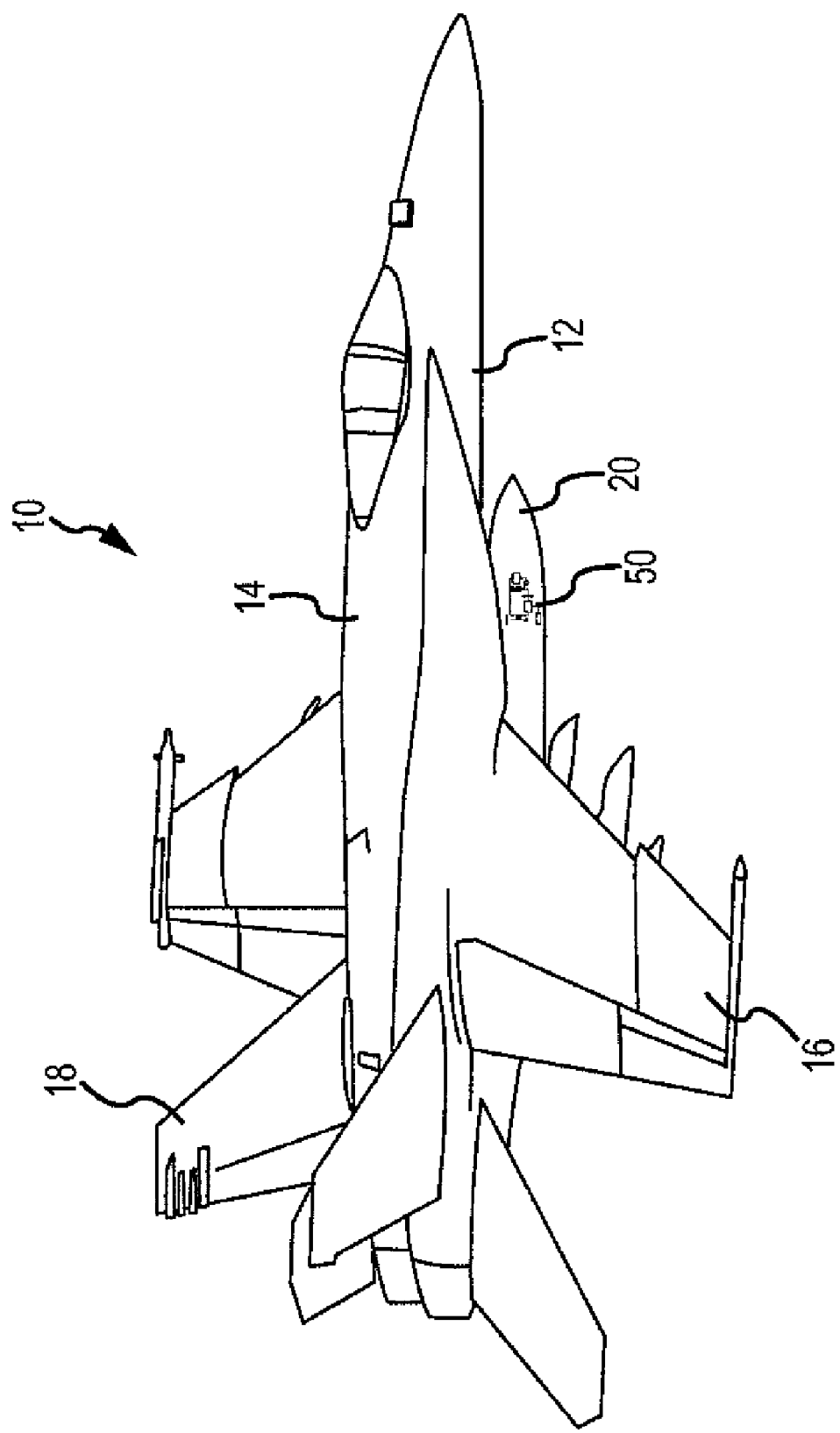
FIG. 1 is an illustration of an aircraft in which one of the advantageous embodiments of the system of the disclosure may be implemented.

Referring more particularly to the drawings, FIG. 1 is an illustration of an aircraft 10 in which one of the embodiments of the system 50 (see FIG. 4) of the disclosure may be implemented. FIG. 1 shows the aircraft 10 comprising an aircraft structure 12 including an elongated body 14, at least one wing 16 extending laterally from the body 14, at least one tail 18 extending longitudinally from the body 14, and a directed energy weapon 20 or heat producing device.

Figure 2:
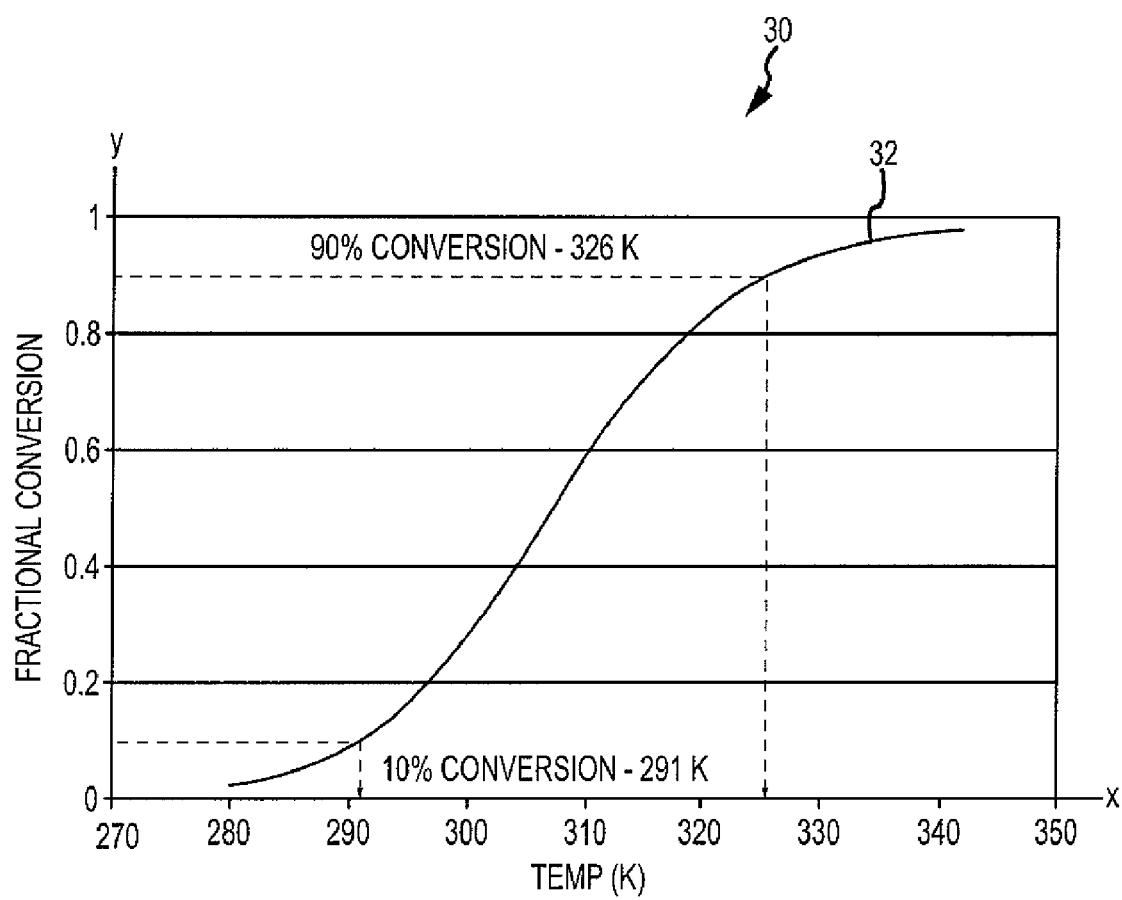
FIG. 2 is an illustration of a graph showing an equilibrium conversion fraction as a function of temperature for a reactant mixture of a fixed stoichiometry for an endothermic chemical reaction.

FIG. 2 is an illustration of a graph 30 of an equilibrium conversion fraction as a function of temperature for a reactant mixture of a fixed stoichiometry for an endothermic chemical reaction. As temperature decreases, the attainable equilibrium conversion fraction decreases. The graph 30 shows fractional conversion of reactants to products (y-axis) for a notional endothermic reaction over a temperature range (x-axis). For such typical chemical reactions, equilibrium for endothermic chemical reactions progresses from reactants to products as temperature increases. Progressively adding heat to a reactant/product mixture causes the temperature to rise and the equilibrium composition to change towards products. The graph shows a plot 32 of what the fractional conversion is as a function of the temperature. The graph shows the x-axis as temperature being the Kelvin scale (K) of temperature. For purposes of this application, the "Kelvin scale" is defined as a thermodynamic (absolute) scale where absolute zero, the theoretical absence of all thermal energy, is zero (0 K). The graph shows the y-axis as fractional conversions 0, 0.2, 0.4, 0.6, 0.8, and 1. Chemical reactions occur progressively over a temperature range. For example, for a reaction of A↔B in the gas phase, the equilibrium constant is $K=K_0 \times e^{-\Delta H/RT}$, where $\Delta H$ is the enthalpy of formation of the products minus that of the reactants at the temperature of interest, R is the molar gas constant, T is the temperature in degrees K, $K_0 = e^{-\Delta S/R}$, and $\Delta S$ is the entropy of the products minus that of the reactants at the temperature of interest. Where the heat of reaction is assumed to be 100 kJ/mol (kilojoule/mole) K and $K_0 = 1 \times 10^{17}$, $K_0 = 1 \times 10^{17} \times e^{-100/RT}$. This can lead to a broad range in equilibrium concentration over a relatively small temperature range, with broad variation in equilibrium concentration for a given reactant mixture. For example, $\Delta T$ (delta temperature or change in temperature)=37 K (degrees Kelvin) for 10% to 90% conversion. This addresses 80% of available chemical endothermicity. The range may change depending on the selected conversion range. As shown in FIG. 2, at 90% conversion, the temperature is 326 K, and at 10% conversion the temperature is 291 K.

Figure 3:
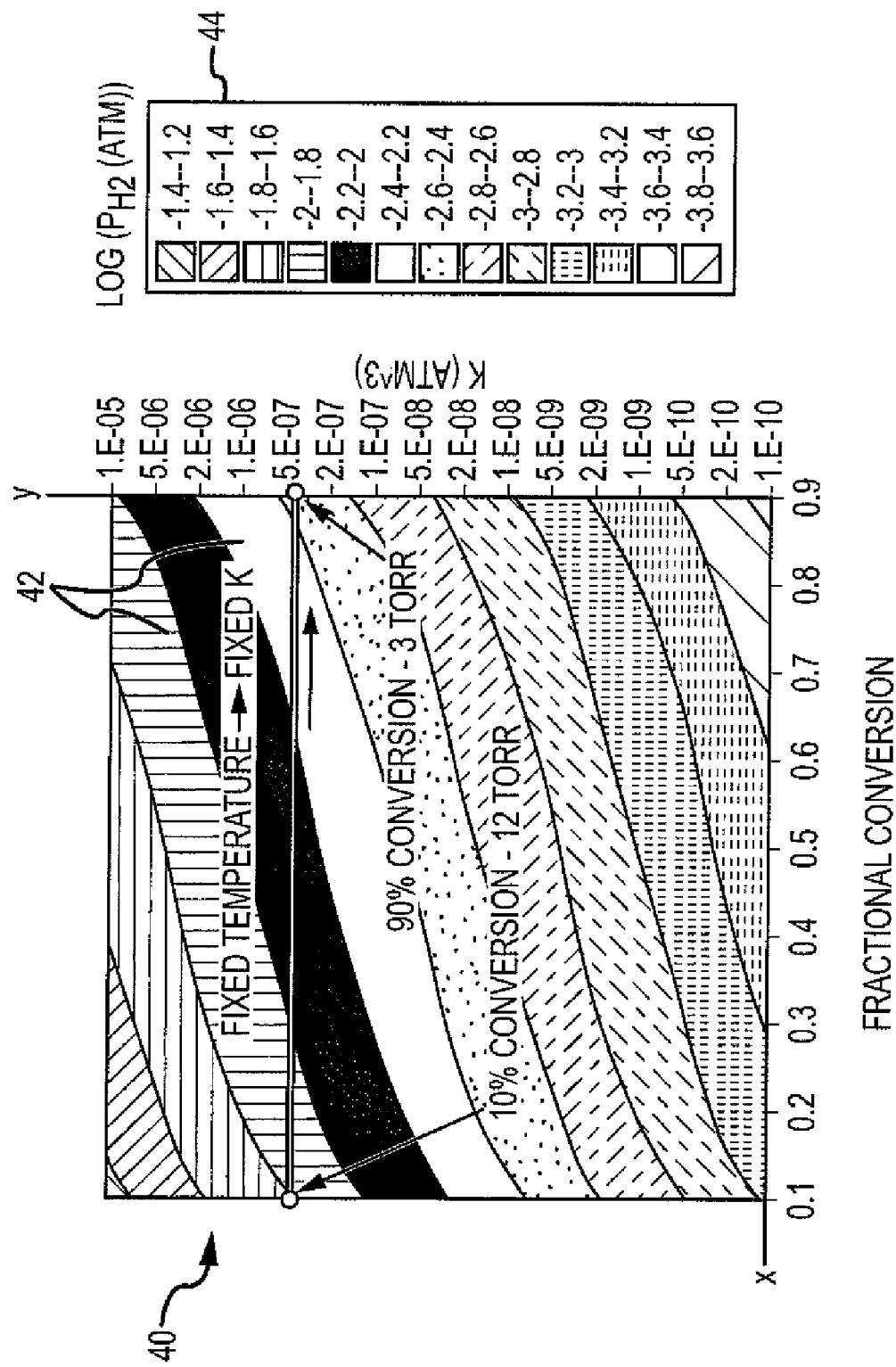
FIG. 3 is an illustration of a graph showing control of chemical reaction conversion by controlling product concentration using one of the advantageous embodiments of the system and method of the disclosure.

FIG. 3 is an illustration of a graph 40 showing control of chemical reaction conversion by controlling product concentration using one of the embodiments of the system and method of the disclosure. Equilibrium conversion may be shifted by controlling concentration of reactants or products. The graph shows plots 42 of what the fractional conversion is as a function of various hydrogen partial pressures. The graph shows the x-axis as fractional conversions 0.1, 0.2, 0.3, 0.4, 0.5, 0.6, 0.7, 0.8, and 0.9. The y-axis shows the equilibrium concentration, K; for a notional reaction, the units may be atm$^3$ where atm is pressure, in atmospheres, 1.E-10 (1×10$^{-10}$), 2.E-10, 5.E-10, 1.E-9, 2.E-9, 5.E-9, 1.E-8, 2.E-8, 5.E-8, 1.E-7, 2.E-7, 5.E-7, 1.E-6, 2.E-6, 5.E-6, 1.E-5. For every value of K, there is a corresponding value of temperature, T. In addition, log ($P_{H2}$(atm—atmosphere)) 44 identifies the corresponding areas of the graph 40, for which the product hydrogen partial pressure concentration corresponds to limits defined in the legend. Reducing the hydrogen partial pressure by a factor of four drives the reaction from 90% reactants to 90% products at a constant temperature. For example, in a gas phase reaction A↔B+3C, such as, $C_7H_{14}$ (methylcyclohexane)→$C_6H_5CH_3$ (toluene)+3$H_2$ (hydrogen) studied in fuel cooling where the concentration of C (hydrogen gas) is controlled and the conversion=B/(A+B), as the methylcyclohexane is converted to toluene, increased hydrogen is pushed into the product stream and must be removed. At a fixed temperature, the conversion of reactants to products is improved. The fixed temperature has a fixed equilibrium constant (K). As shown in FIG. 3, at 90% conversion, the partial pressure of hydrogen or C is 3 torr (for purposes of this application "torr" is defined as the atmospheric pressure that supports a column of mercury 1 millimeter high), and at 10% conversion the partial pressure of hydrogen or C is 12 torr. As the log [H2] is reduced from −1.8 to −2.4 (0.16 atm, or 12 Torr to 0.004 atm, or 3 Torr), the fractional conversion of product increases from 10% to 90%. This is considered at a fixed temperature, therefore at a fixed value of K as shown by the horizontal line on the graph 40. Thus, at a fixed temperature, the chemical reaction conversion may be controlled and the chemical reaction conversion may be improved by reducing the product concentration.

Figure 4:
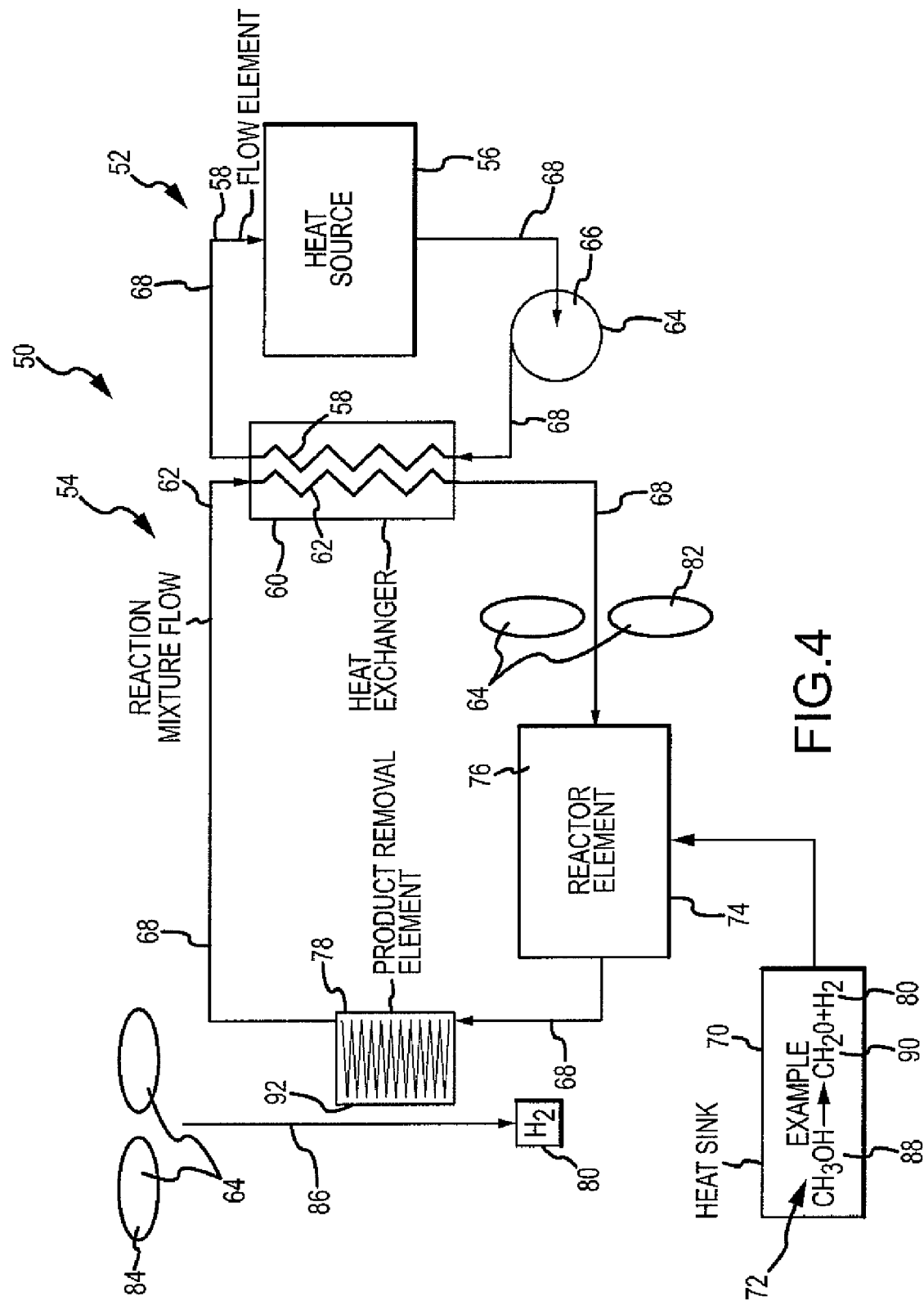
FIG. 4 is an illustration of a schematic diagram of one of the advantageous embodiments of the system of the disclosure.

FIG. 4 is an illustration of a schematic diagram of one of the advantageous embodiments of a chemical reaction-based thermal management system 50 of the disclosure. The system 50 may be used on an airborne platform, a field based platform, a mobile platform, an aircraft, a spacecraft, or another suitable application. The system 50 may comprise a first flow path 52 and a second flow path 54. The first flow path 52 of the system 50 may comprise a heat source 56 for heating a first flow element 58. The heat source 56 may take various forms. For example, without limitation, the heat source 56 may be directed energy weapons. An example of a directed energy weapon may be a laser, a rail gun, a high power microwave system, or another suitable device. Additionally, heat sources may also take other forms. Other heat sources may be, for example, without limitation, a particle accelerator, an X-ray machine, a power conversion subsystem, an electric actuator, a sensor, a parasitic load with a directed energy device, a motive driver in a cooling system, an airframe, or other suitable devices or heat sources. In these examples, the heat source may generate non-constant heat. Non-constant heat may be generated whenever the heat source is operated. Non-constant heat may be from a suitable form of heat. The first flow element 58 may comprise water, high purity water, generator water, heavy water, carbon tetrachloride, fuels, or other suitable flow elements. Preferably, the first flow element 58 is a fluid, where the fluid may be a gas, vapor, or liquid.

The first flow path 52 of the system 50 may comprise a heat exchanger 60 for transferring heat from the first flow element 58 to a reaction mixture flow 62. The reaction mixture flow 62 may comprise one or more chemical reactants and/or products in a liquid phase or phases, and/or a gas phase or a vapor phase. The system 50 further comprises a plurality of driver elements 64 for moving the first flow element 58 through the system 50 and for moving the reaction mixture flow 62 through the system 50. The driver elements 64 may comprise one or more pumps, one or more vents, and/or one or more compressors, or another suitable device for moving the first flow element 58 and/or the reaction mixture flow 62 through the system 50. As shown in FIG. 4, the first flow path 52 may comprise the driver element 64 in the form of a pump 66 for moving the first flow element 58 from the heat source 56 to the heat exchanger 60 via channel elements 68. The first flow element 58 is heated by the heat source 56 and then flows via channel element 68 to pump 66. The first flow element 58 may then be pumped from the pump 66 via channel element 68 to the heat exchanger 60. The first flow element 58 may then flow through the heat exchanger 60 where the heat exchanger 60 transfers heat from the first flow element 58 to the reaction mixture flow 62. The first flow element 58 may then be recirculated from the heat exchanger 60 back to the heat source 56 via channel element 68.

The second flow path 54 of the system 50 may comprise a heat sink 70. The heat sink 70 may comprise one or more endothermic chemical reactions 72 to absorb heat from the heat exchanger 60 and the reaction mixture flow 62. The endothermic chemical reactions 72 may comprise, without limitation, reactions such as dehydrogenation, dehydration, dehydrohalogenation, alkane, alkylation, cyclo-addition, ether cleavage, ether formation, amination, peroxide decomposition, inorganic salts, inorganic acids, inorganic bases, and other suitable endothermic reactions. Each endothermic chemical reaction 72 preferably has a ratio of change in enthalpy ($\Delta H$) to change in entropy ($\Delta S$) of about a temperature of interest. As shown in FIG. 4, an example of an endothermic chemical reaction 72 is methanol ($CH_3OH$) 88 dehydrogentated to formaldehyde ($CH_2O$) 90, absorbing about 90 kJ/mol (kilojoule/mole) or 2800 kJ/kg (kilojoule/kilogram). This can be an effective way of absorbing heat from the heat exchanger 60 or heat source 56 in contrast to phase change systems which absorb less heat per unit of mass, such as ice to water (approximately 335 kJ/kg) or paraffin waxes (approximately 200 kJ/kg).

One of the preferred embodiments of an endothermic chemical reaction that may be used with the system and method of the disclosure is the dehydrogenation of hydrogen peroxide, that is, $H_2O_2(l)$ (hydrogen peroxide)$\rightarrow H_2(g)$ (hydrogen)+$O_2(g)$ (oxygen). The $\Delta Hrxn$ (change in enthalpy) is 5500 kJ/kg. The $\Delta S$ (change in entropy) is 226 J/mol K, where K=1 atm (atmosphere) at 830 K. The competing pathways are (1) decomposition: $H_2O_2 \rightarrow H_2O + \tfrac{1}{2}O_2$, (2) hydrogenation: $H_2O_2 + H_2 \rightarrow 2H_2O$, and (3) oxidation: $H_2 + \tfrac{1}{2}O_2 \rightarrow H_2O$. This is a low temperature reaction with inexpensive reactants and disposable products. In addition, the reactant/product separation is simple. In addition, this reaction has extremely high reaction endothermicity, phase separation allows product concentration control to reduce the rate of reverse reaction, and hydrogen peroxide is producible on a field based platform from water and air using electrochemical cells (see FIG. 6) or a catalytic reactor system.

Other preferred embodiments of endothermic chemical reactions that may be used with the system and method of the disclosure include organic dehydrogenation reactions, such as: (1) alkane dehydrogenation, that is, $C_6H_{12}$ (cyclohexane)$\leftrightarrow C_6H_6$ (benzene)+$3H_2$ (hydrogen), which is a reversible reaction and has a heat capacity of 2452 kJ/kg; (2) $C_2H_6$ (ethane)$\rightarrow C_2H_4$ (ethylene gas)+$H_2$ (hydrogen), which has a heat capacity of 4550 kJ/kg, a $\Delta Hrxn$=136.5 kJ/mol, and a $\Delta Srxn$=120.9 J/mol K, K=1 atm at 1129 K; and (3) $C_2H_6$ (ethane)$\rightarrow C_2H_2$ (acetylene)+$2H_2$ (hydrogen), which has a heat capacity of 10350 kJ/kg. These reactions have high reaction endothermicity, use simple and stable materials, are potentially usable as fuels, and hydrogen membrane separation may be used to control product concentration.

Other preferred embodiments of endothermic chemical reactions that may be used with the system and method of the disclosure include dehydration or dehydrohalogenation reactions, such as: (1) t-$C_4H_9OH$ (tert-butyl alcohol)$\rightarrow$t-$C_4H_8$ (tert-butene)+$H_2O$ (water), which has a heat of reaction of 750 kJ/kg; and (2) $CH_3CH_2Cl$ (chloroethane)$\rightarrow C_2H_4$ (ethylene gas)+HCl (hydrogen chloride), which has a heat of reaction of 1519 kJ/kg. These reactions have high reaction endothermicity, a broad range of compounds, and many product removal elements are available.

The second flow path 54 of the system 50 may further comprise a reactor element 74. The reactor element 74 may be in the form of a catalytic reactor bed 76 or another suitable reactor. The reactor element 74 is designed to approach or attain chemical equilibrium of the reaction mixture flow 62. The second flow path 54 of the system 50 may further comprise a product removal element 78 for removing one or more products 80 from the one or more endothermic chemical reactions 72. The product removal element 78 may comprise a diffusional membrane, a hydrogen membrane, a cellulose membrane, a synthetic membrane, an absorption system, an adsorption system, a venting system, a transport system, a physical separation system, a separate chemical reaction system which converts one or more of the products from the one or more endothermic chemical reactions, or other suitable product removal elements. The second flow path 54 of the system 50 may further comprise driver elements 64 for moving the reaction mixture flow 62 through the system 50. As shown in FIG. 4, the second flow path 54 may comprise driver elements 64 in the form of a first set of vents 82 or fans, blowers, eductors, or compressors, for blowing, compressing, or moving the reaction mixture flow 62 from the heat exchanger 60 to the reactor element 74 via channel element 68 when the reaction mixture flow is a gas or vapor. Alternatively, the driver element 64 may comprise a set of pumps or eductors for pumping or moving the reaction mixture flow 62 from the heat exchanger 60 to the reactor element 74 via channel element 68 when the reaction mixture flow is one or more liquid phases. As shown in FIG. 4, the second flow path 54 may further comprise driver element 64 in the form of a second set of vents 84 or fans, blowers, eductors, or compressors for blowing or compressing gas or vapor 86, such as ambient air or another vapor or gas on the product 80 to assist the product removal element 78 in removal of the product 80 from the system 50. The second flow path 54 of the system 50 may further comprise the heat exchanger 60. The heat exchanger 60 may be in communication between the first flow path 52 and the second flow path 54. In an alternative embodiment to that shown in FIG. 4, the reactor element 74 may be integrated with the heat exchanger 60 in the second flow path

54. In the second flow path 54, the reaction mixture flow 62 flows through the heat exchanger 60, where the heat exchanger 60 transfers heat to the reaction mixture flow 62 from the first flow element 58. The reaction mixture flow 62 then flows via channel element 68 to the first set of vents 82. The reaction mixture flow 62 may then be blown or moved via the vents 82 through the channel element 68 to the reactor element 74 where the reactor element 74 approaches or attains the chemical equilibrium of the reaction mixture flow 62. As the reaction mixture flow 62 approaches or attains equilibrium in the reactor element 74, the reaction mixture flow 62 loses heat. As the reaction mixture flow 62 leaves the reactor element 74 via channel element 68, one or more products 80 may be removed by the product removal element 78. Once the product removal element 78 has removed one or more products 80, the reaction mixture flow 62 may be cooled and displaced from equilibrium, and the reaction mixture flow 62 recirculates via channel element 68 back to the heat exchanger 60. The reaction mixture flow 62 may then be heated in the heat exchanger 60.

The system 50 provides a near constant temperature and controllable cooling of the heat source 56, and drives the one or more endothermic chemical reactions 72 to proceed from reactants to products by control of product concentrations. The temperature of the heat sink of the system is preferably slightly below the temperature of the heat exchanger or heat source. For example, if the heat source is a laser running at 25 degrees Celsius, the temperature of the heat sink may be about 0 (zero) degrees Celsius, and if the heat source is a high power microwave running at 70 degrees Celsius, the temperature of the heat sink may be about 30-40 degrees Celsius. The chemical reaction-based thermal management system 50 of the disclosure uses endothermic chemical reactions 72 to absorb heat from the heat exchanger 60 or heat source 56. With the disclosed embodiments, equilibrium may be driven towards products by selectively removing one or more products 80 from the reaction. The reaction flow mixture may be maintained at constant temperature while heat is being added by removing one or more of the products 80 so that conversion of reactants to products increases. The system 50 as shown in FIG. 4 selectively removes one of the products 80 of the endothermic chemical reaction 72, thereby shifting the equilibrium towards products even at lower temperatures or pressures. For example, the catalytic reactor bed 76 may be fed a recirculating reactant stream 62 of gaseous methanol 88. The catalytic reactor bed 76 dehydrogenates the methanol 88, producing formaldehyde 90 and hydrogen product 80. The hydrogen 80 is then removed in a selective removal step via the product removal element 78, e.g., a cellulose or synthetic membrane through which the hydrogen diffuses. The product removal element 78 minimizes heat release to counter in whole or in part the heat removed by the endothermic chemical reaction 72. The product removal element 78 is configured to remove the hydrogen product 80 so as to reduce the rate at which the hydrogen re-migrates back into the system 50. For example, vapor 86 such as ambient air may be fed to a backside 92 of the product removal element 78. The illustration of system 50 in FIG. 4 is not meant to imply physical or architectural limitations to the manner in which different advantageous embodiments may be implemented. For example, without limitation, some embodiments may have other components in addition to or in place of the ones illustrated. Further, some components may be unnecessary in other embodiments.

Although different advantageous embodiments have been described with respect to aircraft and airborne platforms, other advantageous embodiments may be applied to other types of craft and platforms. For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a spacecraft, a space station, a satellite, a submarine, a surface ship, a bus, a personnel carrier, a tank, a train, an automobile, a power plant, a dam, a manufacturing facility, a building and/or other suitable object.

Figure 5:
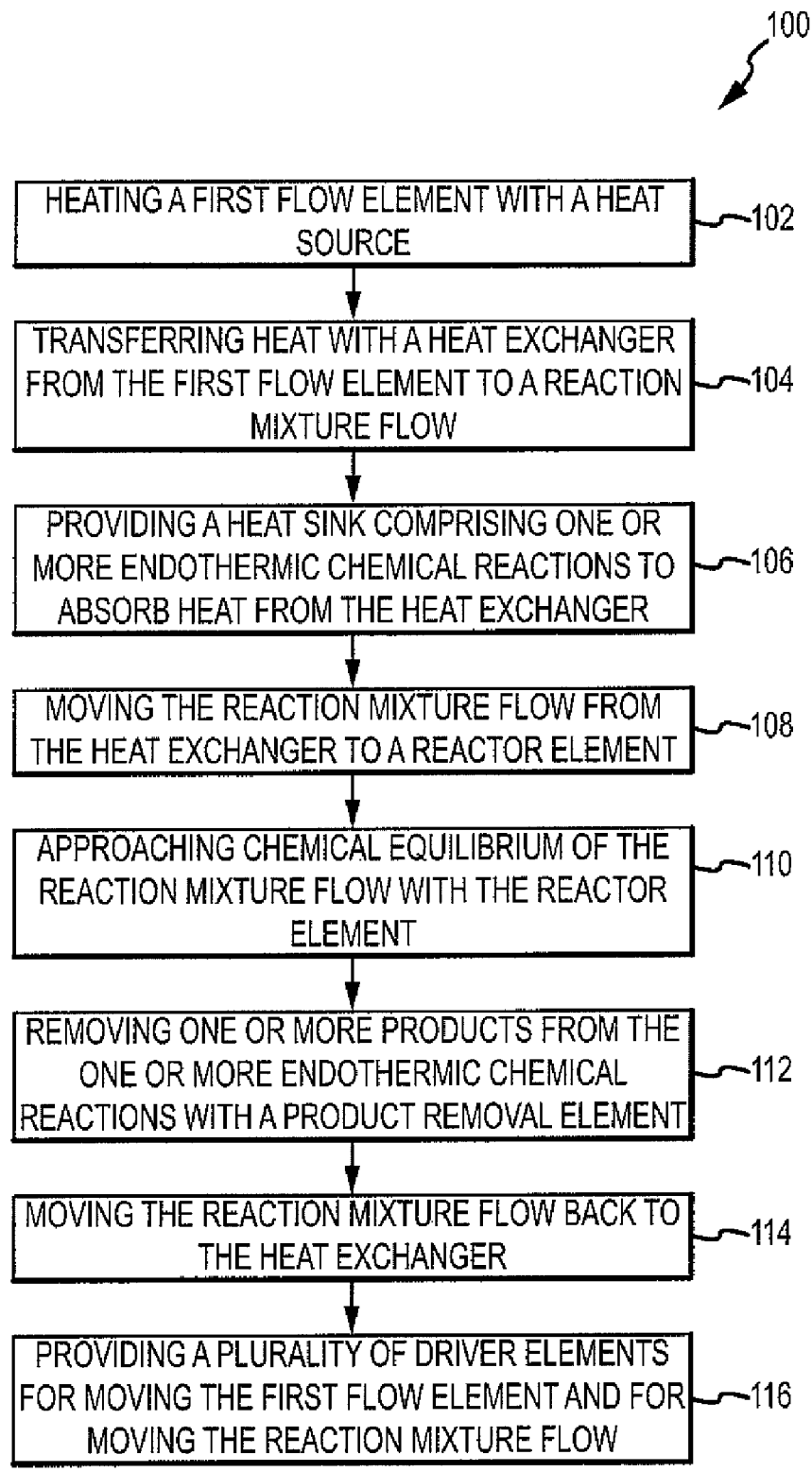
FIG. 5 is an illustration of a block diagram of one of the advantageous embodiments of the method of the disclosure.

FIG. 5 is an illustration of a block diagram of one of the advantageous embodiments of a method 100 for chemical reaction-based thermal management of the disclosure. The method 100 for chemical reaction-based thermal management may be used on an airborne platform, a field based platform, or another suitable application. The method 100 comprises step 102 of heating a first flow element 58 (see FIG. 4) with a heat source 56 (see FIG. 4). As discussed above, the first flow element 58 may comprise water, high purity water, generator water, heavy water, carbon tetrachloride, fuels, or another suitable flow element. The heat source 56 may comprise a directed energy weapon, a laser, a rail gun, a high power microwave system, a particle accelerator, an X-ray machine, a power conversion subsystem, an electric actuator, a sensor, a parasitic load with a directed energy device, a motive driver in a cooling system, an airframe, or another suitable device. The method 100 further comprises step 104 of transferring heat with a heat exchanger 60 (see FIG. 4) from the first flow element 58 to a reaction mixture flow 62 (see FIG. 4). The reaction mixture flow 62 may comprise one or more chemical reactants in a liquid phase or a gas phase. The method 100 further comprises step 106 of providing a heat sink 70 (see FIG. 4) comprising one or more endothermic chemical reactions 72 (see FIG. 4) to absorb heat from the heat exchanger 60. As discussed above, the endothermic chemical reactions 72 may comprise reactions such as dehydrogenation, dehydration, dehydrohalogenation, alkane, alkylation, cyclo-addition, ether cleavage, ether formation, amination, peroxide decomposition, inorganic salts, inorganic acids, inorganic bases, or other suitable reactions. Each endothermic chemical reaction may have a ratio of change in enthalpy to change in entropy of about a temperature of interest. The method 100 further comprises step 108 of moving the reaction mixture flow 62 from the heat exchanger 60 to a reactor element 74 (see FIG. 4) such as a catalytic reactor bed 76 (see FIG. 4). The method 100 further comprises step 110 of approaching chemical equilibrium of the reaction mixture flow 62 with the reactor element 74 such as the catalytic reactor bed 76. The method 100 further comprises step 112 of removing one or more products 80 (see FIG. 4) from the one or more endothermic chemical reactions 72 with a product removal element 78 (see FIG. 4). As discussed above, the product removal element 78 may comprise a diffusional membrane, a hydrogen membrane, a cellulose membrane, a synthetic membrane, an absorption system, an adsorption system, a venting system, a transport system, a physical separation system, a separate chemical reaction system which converts one or more of the products from the one or more endothermic chemical reactions, or another suitable product removal element. The method 100 further comprises step 114 of moving the reaction mixture flow 62 back to the heat exchanger 60. The method 100 may further comprise step 116 of providing a plurality of driver elements 64 (see FIG. 4) for moving the first flow element 58 and for moving the reaction mixture flow 62. The driver elements 64 may comprise one or more pumps 66 or eductors, one or more vents 82, 84, or blowers, fans, compressors, or eductors, and/or one or more compressors (not shown) or other suitable driver elements 64. The method 100 provides a near constant temperature and controllable cooling of the heat source 56, and the method 100 drives the one or more endothermic chemical reactions 72 to proceed from reactants to products by control of product concentrations. In an alternate embodiment, the reactor element 74 may be integrated with the heat exchanger 60. In another alternate embodiment, the product removal element 78 may be integrated with the heat exchanger 60.

In a practical implementation of the system 50 and method 100 of the disclosure, by-products and waste products of the system and method may be disposed of or regenerated on the platform depending on the platform payload requirements. For example, when hydrogen is a product that is selectively removed from the circulating stream, a re-hydrogenation capability can be achieved through a second catalyst bed (not shown) and a hydrogen source, for example, without limitation, one or more water electrochemical cells 128 (see FIG. 6). Whether located with the payload or in a support package, this may provide a significant reduction to the logistics tail of the system by requiring water, rather than the actual thermal management reagent, as the make-up supply.

The disclosed system and method use endothermic chemical reactions with product composition control to provide a path to lightweight thermal management for directed energy weapons and other applications such as hypersonic cooling. Heat may be absorbed at a lower temperature than in known methods and a higher conversion from reactants to products may be achieved over a narrower temperature range. The disclosed system and method drive the endothermic chemical reactions as rapidly as needed in a weight-effective way, and remove products efficiently without reintroducing significant heat back into the endothermic chemical reaction.

Figure 6:
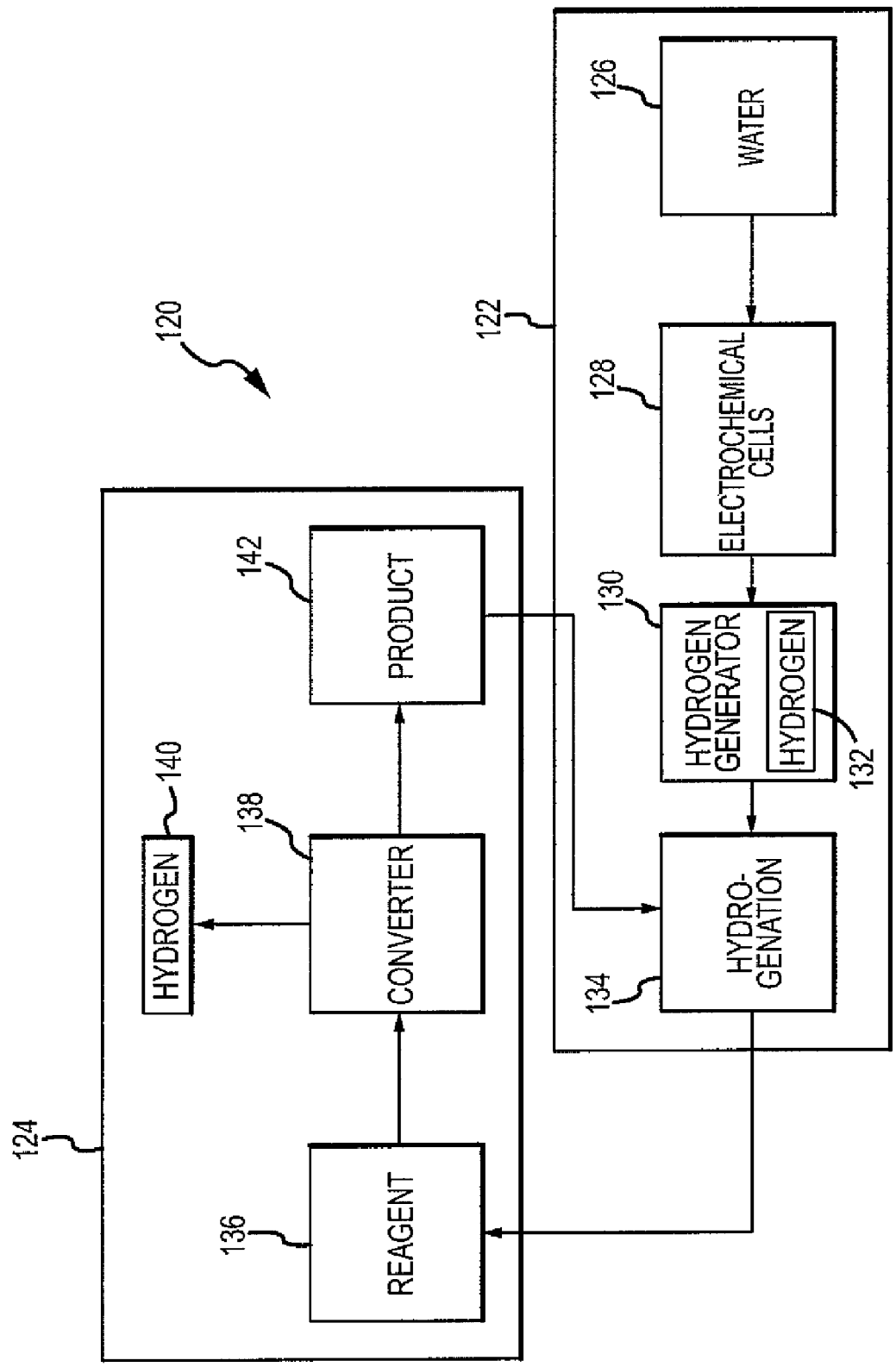
FIG. 6 is an illustration of a block diagram of another one of the advantageous embodiments of the system of the disclosure; and, FIG. 7 is an illustration of a perspective view of another one of the advantageous embodiments of the system of the disclosure.

FIG. 6 is an illustration of a block diagram of one of the embodiments of a combination airborne platform and field based platform chemical reaction-based thermal management system 120. The system 120 comprises a field based platform 122 and an airborne platform 124. The system 120 used with the field based platform 122, which is preferably on the ground, may comprise starting with water 126 and then using electrochemical cells 128 to act as a hydrogen generator 130. The hydrogen 132 from the hydrogen generator 130 may be used for hydrogenation 134. The system 120 used with the airborne platform 124 may comprise a de-hydrogenation reaction of a hydrocarbon, such as for example, without limitation, a reaction from ethane to ethylene may be used. A reagent 136 such as ethane may be converted with a converter 138 from ethane to ethylene during flight and hydrogen 140 may be removed from the converter on the airborne platform 124 to promote the reaction conversion fraction. A produced product 142 from the reaction may be ethylene. The ethylene may be produced on the airborne platform 124. The ethylene may then go through hydrogenation 134 on the ground on the field based platform 122. The hydrogen may be recovered on the ground. It is preferable to select a chemical that can be regenerated in the field. With reagents on the ground, products may be converted back to reactants. For example, rather than shipping hundred kilograms of ethane, water may be used instead as a means of producing hydrogen, and water is readily available. For the dehydrogenation of ethane, the chemical reaction is $C_2H_6$ (ethane)→$C_2H_4$ (ethylene)+$H_2$ (hydrogen). The reaction occurs from about 300 degrees C. to about 900 degrees C. in the presence of a locally heated (microwave) catalyst with percentage conversion increasing with temperature.

Figure 7:
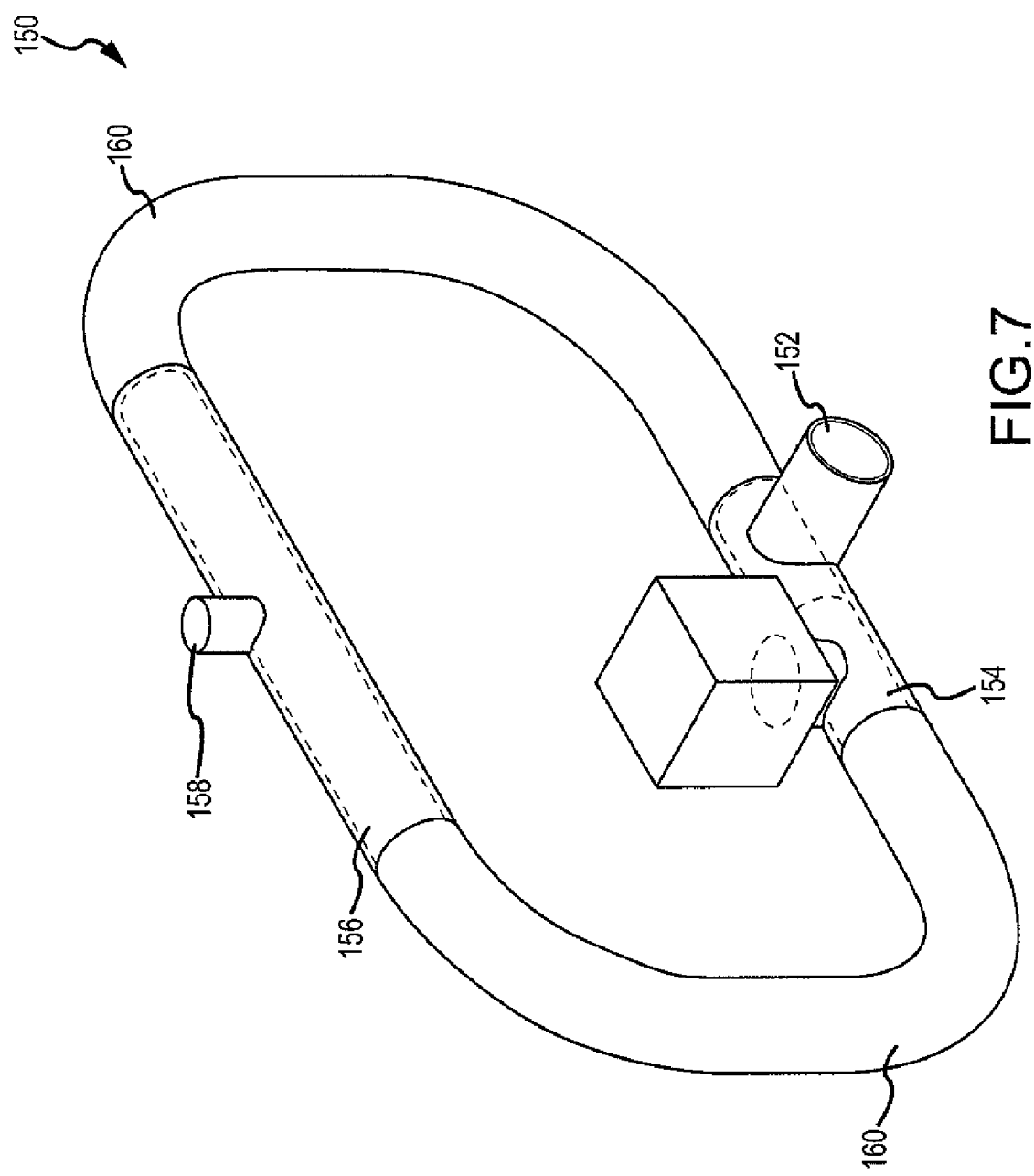

FIG. 7 is an illustration of a perspective view of another embodiment of a chemical reaction-based thermal management system 150. The system 150 comprises an inlet 152 for receiving heat from a heat source (not shown), a reactor element 154 in the form of a catalytic reactor bed, a product removal element 156 in the form of thin palladium tubes, an outlet 158 for removal of the product such as hydrogen, and a channel element 160 for circulating a reaction mixture flow (not shown) such as ethane through the system 150.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A chemical reaction-based thermal management system comprising:
   a heat source for heating a first flow element;
   a heat exchanger for transferring heat from the first flow element to a reaction mixture flow;
   a heat sink comprising one or more endothermic chemical reactions to absorb heat from the heat exchanger;
   a reactor element for approaching chemical equilibrium of the reaction mixture flow;
   a product removal element for removing one or more products from the one or more endothermic chemical reactions; and,
   a plurality of driver elements for moving the first flow element and for moving the reaction mixture flow.

2. The system of claim 1 wherein the heat source comprises a directed energy weapon, a laser, a rail gun, a high power microwave system, a particle accelerator, an X-ray machine, a power conversion subsystem, an electric actuator, a sensor, a parasitic load with a directed energy device, a motive driver in a cooling system, or an airframe.

3. The system of claim 1 wherein the first flow element is selected from the group consisting of water, high purity water, generator water, heavy water, carbon tetrachloride, and fuels.

4. The system of claim 1 wherein the reaction mixture flow comprises one or more chemical reactants in a liquid phase or a gas phase.

5. The system of claim 1 wherein the endothermic chemical reactions are reactions selected from the group consisting of dehydrogenation, dehydration, dehydrohalogenation, alkane, alkylation, cyclo-addition, ether cleavage, ether formation, amination, peroxide decomposition, inorganic salts, inorganic acids, and inorganic bases.

6. The system of claim 1 wherein each endothermic chemical reaction has a ratio of change in enthalpy to change in entropy of about a temperature of interest.

7. The system of claim 1 wherein the reactor element is a catalytic reactor bed.

8. The system of claim 1 wherein the product removal element comprises a diffusional membrane, a hydrogen membrane, a cellulose membrane, a synthetic membrane, an absorption system, an adsorption system, a venting system, a transport system, a physical separation system or a separate chemical reaction system which converts one or more of the products from the one or more endothermic chemical reactions.

9. The system of claim 1 wherein the plurality of driver elements is selected from the group consisting of pumps, vents, blowers, fans, eductors, and compressors.

10. The system of claim 1 wherein the reactor element is integrated with the heat exchanger.

11. The system of claim 1 wherein the system provides a near constant temperature and controllable cooling of the heat source, and further wherein the system drives the one or more endothermic chemical reactions to go from reactants to products by control of product concentrations.

12. The system of claim 1 for use on an airborne platform, a field based platform, a mobile platform, an aircraft, or a spacecraft.

13. A chemical reaction-based thermal management system for use on an airborne platform or a field based platform, the system comprising:

a heat source for heating a first flow element, wherein the first flow element is selected from the group consisting of water, high purity water, generator water, heavy water, carbon tetrachloride, and fuels;

a heat exchanger for transferring heat from the first flow element to a reaction mixture flow, wherein the reaction mixture flow comprises one or more chemical reactants in a liquid phase or a gas phase;

a heat sink comprising one or more endothermic chemical reactions to absorb heat from the heat exchanger, wherein the endothermic chemical reactions are reactions selected from the group consisting of dehydrogenation, dehydration, dehydrohalogenation, alkane, alkylation, cyclo-addition, ether cleavage, ether formation, amination, peroxide decomposition, inorganic salts, inorganic acids, and inorganic bases, and further wherein each endothermic chemical reaction has a ratio of change in enthalpy to change in entropy of about a temperature of interest;

a catalytic reactor bed for approaching chemical equilibrium of the reaction mixture flow;

a product removal element for removing one or more products from the one or more endothermic chemical reactions, wherein the product removal element comprises a diffusional membrane, a hydrogen membrane, a cellulose membrane, a synthetic membrane, an absorption system, an adsorption system, a venting system, a transport system, a physical separation system, or a separate chemical reaction system which converts one or more of the products from the one or more endothermic chemical reactions; and, a plurality of driver elements for moving the first flow element and for moving the reaction mixture flow, wherein the plurality of driver elements is selected from the group consisting of pumps, vents, blowers, fans, eductors, and compressors, wherein the system provides a near constant temperature and controllable cooling of the heat source, and further wherein die system drives the one or more endothermic chemical reactions to proceed from reactants to products by control of product concentrations.

14. A method for chemical reaction-based thermal management comprising:

heating a first flow element with a heat source;

transferring heat with a heat exchanger from the first flow element to a reaction mixture flow;

providing a heat sink comprising one or more endothermic chemical reactions to absorb heat from the heat exchanger;

moving the reaction mixture flow from the heat exchanger to a reactor element;

approaching chemical equilibrium of the reaction mixture flow with the reactor element;

removing one or more products from the one or more endothermic chemical reactions with a product removal element; and, moving the reaction mixture flow back to the heat exchanger.

15. The method of claim 14 further comprising providing a plurality of driver elements for moving the first flow element and for moving the reaction mixture flow.

16. The method of claim 14 wherein the heat source comprises a directed energy weapon, a laser, a rail gun, a high power microwave system, a particle accelerator, an X-ray machine, a power conversion subsystem, an electric actuator, a sensor, a parasitic load with a directed energy device, or a motive driver in a cooling system.

17. The method of claim 14 wherein the first flow element is selected from the group consisting of water, high purity water, generator water, heavy water, carbon tetrachloride, and fuels.

18. The method of claim 14 wherein the endothermic chemical reactions are reactions selected from the group consisting of dehydrogenation, dehydration, dehydrohalogenation, alkane, alkylation, cyclo-addition, ether cleavage, ether formation, amination, peroxide decomposition, inorganic salts, inorganic acids, and inorganic bases.

19. The method of claim 14 wherein the reactor element is integrated with the heat exchanger.

20. A method for chemical reaction-based thermal management for use on an airborne platform or a field based platform, the method comprising:

heating a first flow element with a heat source, wherein the first flow element is selected from the group consisting of water, high purity water, generator water, heavy water, carbon tetrachloride, and fuels;

transferring heat with a heat exchanger from the first flow element to a reaction mixture flow, wherein the reaction mixture flow comprises one or more chemical reactants in a liquid phase or a gas phase;

providing a heat sink comprising one or more endothermic chemical reactions to absorb heat from the heat exchanger, wherein the endothermic chemical reactions are reactions selected from the group consisting of dehydrogenation, dehydration, dehydrohalogenation, alkane, alkylation, cyclo-addition, ether cleavage, ether formation, amination, peroxide decomposition, inorganic salts, inorganic acids, and inorganic bases, and further wherein each endothermic chemical reaction has a ratio of change in enthalpy to change in entropy of about a temperature of interest;

moving the reaction mixture flow from the heat exchanger to a catalytic reactor bed;

approaching chemical equilibrium of the reaction mixture flow with the catalytic reactor bed;

removing one or more products from the one or more endothermic chemical reactions with a product removal element, wherein the product removal element comprises a diffusional membrane, a hydrogen membrane, a cellulose membrane, a synthetic membrane, an absorption system, an adsorption system, a venting system, a transport system, a physical separation system, or a separate chemical reaction system which converts one or more of the products from the one or more endothermic chemical reactions;

moving the reaction mixture flow back to the heat exchanger; and, providing a plurality of driver elements for moving the first flow element and for moving the reaction mixture flow, wherein the plurality of driver elements is selected from the group consisting of pumps, vents, blowers, fans, eductors, and compressors, wherein the method provides a near constant temperature and controllable cooling of the heat source, and further wherein the method drives the one or more endothermic chemical reactions to proceed from reactants to products by control of product concentrations.

* * * * *